United States Patent [19]
Hayes et al.

[11] Patent Number: 6,075,117
[45] Date of Patent: Jun. 13, 2000

[54] PROCESS FOR THE HYDROLYSIS OF ADIPONITRILE AND THE PRODUCTION OF NYLON 6,6 USING DICARBOXYLIC ACIDS AS THE SOLE CATALYST

[75] Inventors: Richard Allen Hayes, Brentwood, Tenn.; David Neil Marks, Newark; Maria Van Eijndhoven, Bear, both of Del.

[73] Assignee: E.I. Dupont De Nemours & Company, Wilmington, Del.

[21] Appl. No.: 09/217,798

[22] Filed: Dec. 21, 1998

[51] Int. Cl.⁷ .................................................. C08G 69/28
[52] U.S. Cl. ........................... 528/332; 528/310; 528/312; 528/315; 528/322; 528/323; 528/324; 528/335; 528/336
[58] Field of Search ...................... 528/310, 315, 528/312, 322, 323, 324, 332, 335, 336

[56] References Cited

U.S. PATENT DOCUMENTS

| | | | |
|---|---|---|---|
| T875,023 | 6/1970 | Knowles et al. | |
| 2,245,129 | 6/1941 | Greenewalt | 260/2 |
| 3,833,647 | 9/1974 | Gelbein et al. | 260/515 |
| 3,847,876 | 11/1974 | Onsager | 260/78 |
| 3,922,147 | 11/1975 | Sze et al. | 23/283 |
| 3,968,152 | 7/1976 | Sze et al. | 260/515 |
| 4,214,087 | 7/1980 | Fannelli et al. | 546/319 |
| 4,436,898 | 3/1984 | Hofmann et al. | 528/336 |
| 4,490,521 | 12/1984 | Coffey et al. | 528/336 |
| 4,501,881 | 2/1985 | Greene et al. | 528/336 |
| 4,520,190 | 5/1985 | Coffey et al. | 528/336 |
| 4,528,362 | 7/1985 | Hofmann et al. | 528/336 |
| 4,542,205 | 9/1985 | Curatolo et al. | 528/336 |
| 4,543,407 | 9/1985 | Curatolo et al. | 528/336 |
| 4,568,736 | 2/1986 | Curatolo et al. | 528/313 |
| 4,603,192 | 7/1986 | Coffey et al. | 528/336 |
| 4,629,776 | 12/1986 | Curatolo et al. | 528/313 |
| 4,640,976 | 2/1987 | Curatolo et al. | 528/336 |
| 4,689,394 | 8/1987 | Curatolo et al. | 528/336 |
| 4,719,285 | 1/1988 | Curatolo et al. | 528/336 |
| 4,725,666 | 2/1988 | Curatolo et al. | 528/336 |
| 4,732,965 | 3/1988 | Curatolo et al. | 528/336 |
| 4,734,487 | 3/1988 | Curatolo et al. | 528/336 |
| 4,739,035 | 4/1988 | Shyu et al. | 528/335 |
| 4,749,776 | 6/1988 | Sentman et al. | 528/336 |
| 4,801,748 | 1/1989 | Murahashi et al. | 564/126 |
| 4,942,220 | 7/1990 | Murahashi et al. | 528/336 |
| 5,109,104 | 4/1992 | Marks | 528/313 |
| 5,185,427 | 2/1993 | Marks | 528/329.1 |
| 5,306,804 | 4/1994 | Liehr et al. | 528/335 |
| 5,596,070 | 1/1997 | Gotz | 528/310 |
| 5,627,257 | 5/1997 | Leihr | 528/335 |
| 5,674,974 | 10/1997 | Brearley et al. | 528/340 |

FOREIGN PATENT DOCUMENTS

| | | | |
|---|---|---|---|
| 44 18 540 A1 | 5/1994 | Germany | C08G 69/28 |
| 196 35 077 A1 | 8/1996 | Germany | C08G 69/00 |
| 1260755 | 2/1969 | United Kingdom | C07C 63/26 |
| 1377333 | 2/1973 | United Kingdom | C07C 63/00 |
| WO98/08889 A2 | 3/1998 | WIPO | C08G 60/00 |

*Primary Examiner*—P. Hampton-Hightower
*Attorney, Agent, or Firm*—Shanks & Herbert

[57] ABSTRACT

A process for the hydrolysis of a dinitrile (e.g., adiponitrile) utilizing a dicarboxylic acid (e.g., adipic acid) as the sole catalyst followed by addition of a diamine (e.g., hexamethylenediamine) and heating to produce polymerization. Such a process is particularly usefull in the production of nylon 6,6 having a low BHMT content and improved melt stability.

15 Claims, No Drawings

PROCESS FOR THE HYDROLYSIS OF ADIPONITRILE AND THE PRODUCTION OF NYLON 6,6 USING DICARBOXYLIC ACIDS AS THE SOLE CATALYST

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to a process for the hydrolysis of adiponitrile and production of nylon 6,6. More specifically, the invention relates to the catalytic hydrolysis of adiponitrile under autogenous conditions using a dicarboxylic acid as the sole catalyst followed by addition of a diamine to the hydrolysate to produce polyamide.

2. Description of Related Art

Polyamides are currently produced commercially from dicarboxylic acids and diamines. For example, nylon 6,6 is commercially produced from adipic acid and hexamethylenediamine. Alternate routes to these materials have been explored within the art. For example, the art has taught processes to produce nylon 6,6 from adiponitrile and hexamethylenediamine. U.S. Pat. No. 2,245,129, discloses a process to produce polyamides by reacting adiponitrile, hexamethylenediamine, and water at high temperatures and pressures. A modified process to react adiponitrile with hexamethylenediamine and water was disclosed in U.S. Pat. No. 3,847,876. Catalysts were introduced into the processes to promote this reaction as disclosed by U.S. Pat. Nos. 4,490,521; 4,542,205; 4,603,192; 4,725,666; 4,749,776; 4,436,898; and 4,528,362. U.S. Pat. No. 4,501,881, discloses a process to form polyamides from adiponitrile, hexamethylenediamine, adipic acid and water. A significant shortcoming of these before mentioned processes to produce polyamides from adiponitrile and hexamethylenediamine is the production of significant levels of the dimer of the aliphatic diamine. In the case of hexamethylenediamine, the dimer product would be bis(hexamethylene)triamine (BHMT). As taught in U.S. Pat. No. 4,739,035 and U.S. Pat. No. 5,627,257 the diamine dimerization is promoted by the high temperatures and pressures required by the processes. These as formed diamine dimers or triamines serve as crosslinkers for the linear polyamide chain. The resultant gel content has been found to lead to significant product quality deterioration.

This shortcoming was partially overcome through a two step process disclosed in U.S. Pat. No. 4,739,035. The first step involved the hydrolysis of adiponitrile with water, catalysts and from 0 to 10 weight of the total hexamethylenediamine needed for the reaction. The second step consisted of adding the remainder of the hexamethylenediamine followed by polymerization. Such a two step process provided triamine levels in the 560 to 1300 ppm levels versus the 1,420 to 1,610 ppm levels found through the teachings of other background art.

This shortcoming was more overcome through a further two step process disclosed in U.S. Pat. No. 5,627,25 The first step consisted of the nearly fill hydrolysis of the adiponitrile to adipic acid utilizing a catalyst and a cocatalyst. The cocatalyst was described as a saturated aliphatic or aromatic dicarboxylic acid. The second step consisted of the addition of at least an equimolar amount of diamine followed by polymerization. Through use of this process, they were able to achieve triamine levels between 500 and 600 ppm. A shortcoming of this process was the substantial amounts of catalyst utilized. The level of the catalyst exemplified ranged from about 1 to 1.5 weight percent based on the adiponitrile level. For example, the patent teaches the use of 5 grams of orthophosphorous acid and 1.8 grams of calcium hypophosphite catalyst in the hydrolysis of 487 grams of adiponitrile, (see U.S. Pat. No. 5,627,257, Example 1).

BRIEF SUMMARY OF THE INVENTION

The present invention overcomes the shortcomings of the background art providing polyamides with low levels of triamine impurities without the need for added catalysts. The present invention provides a two step process (i.e., nitrile hydrolysis followed by the addition of the diamine and polymerization) utilizing a dicarboxylic acid as the sole catalyst. The polyamide product of the invention has been found to have lowered triamine levels when compared to single step processes which utilize dicarboxylic acids as the sole catalyst, (see, for example, U.S. Pat. No. 4,501,881). The present invention has further been found to avoid the shortcomings of the art which incorporates significant amounts of additional catalysts, (see, for example U.S. Pat. No. 5,627,257). In addition to avoiding the use of said additional catalysts, the as-formed polyamide product has been surprisingly found to have greater melt stability.

One aspect of the present invention involves the hydrolysis of nitriles with dicarboxylic acids as the sole catalyst. This process involves heating the nitrile, water, and a dicarboxylic acid in the temperature range of 200 to 300° C. Surprisingly it has been found that this process provides essentially complete nitrile hydrolysis without the need of the high levels of additional catalysts required in the above mentioned background art.

A further aspect of the present invention comprises the use of the as formed nitrile hydrolysate in the production of polyamides. This was performed by adding the diamine to the hydrolysate followed by heating and polymerization. Surprisingly the produced polyamides of the present invention have been found to have low levels of the above mentioned triamine impurities. The as-formed polyamide products have further been surprisingly found to have greater melt stability than those produced through the teachings of the art.

Thus, the present invention provides an improved process for producing polyamide comprising the steps of:

a) reacting a dinitrile containing 2 to 20 carbon atoms with at least a stoichiometric amount of water in the presence of a dicarboxylic acid as the sole catalyst at a temperature from 200 to 300° C. in a closed vessel under autogenous conditions substantially free of air for a time sufficient for at least 95 mole % of the dinitrile to undergo hydrolysis and form a hydrolysate;

b) adding a diamine to said hydrolysate formed in step (a). wherein the amount of diamine is within 10 mole % of equimolar based on the starting amount of dinitrile;

c) heating the hydrolysate and diamine mixture in the presence of water for a time sufficient to polymerize; and then d) recovering polyamide characterized by low triamine content and improved melt stability.

In one embodiment of the process the dinitrile is selected from the group consisting of adiponitrile, suberonitrile, sebaconitrile, 1,12-dodecane dinitrile, terephthalonitrile, and methyl glutaronitrile and wherein the diamine is selected from the group consisting of hexamethylenediamine, tetramethylenediamine, 1,12-dodecane diamine, and p-xylene diamine. Preferably, the dinitrile is adiponitrile, the diamine is hexamethylenediamine, and the dicarboxylic acid is adipic acid and the recovered polyamide (nylon 6,6) is characterized by a BHMT content of below 1,000 ppm.

DETAILED DESCRIPTION OF INVENTION

One aspect of the present invention involves the hydrolysis of nitriles with dicarboxylic acids as the sole catalyst This process involves heating the nitrile, water, and a dicarboxylic acid in the temperature range of 200 to 300° C. Surprisingly it has been found that this process provides essentially complete nitrile hydrolysis without the need of the high levels of additional catalysts required in the above mentioned background art.

In the present invention, nitrile is meant to include any material which incorporates a nitrile functionality. Preferably, the nitrile will be a dinitrile containing from 2 to 20 carbons. The dinitrile may be aliphatic, straight chain or branched, or aromatic. The dinitrile may contain other functionalities. Specific examples of dinitriles which may find use within the present invention include adiponitrile, suberonitrile, sebaconitrile, 1,12-dodecane dinitrile, terephthalonitrile, methyl glutaronitrile, and the like. More preferably, the dinitrile is adiponitrile.

Water is used in the present invention both as a reactant in the hydrolysis of the nitrile and as a processing aid in the polymerization. The amount of water required in the nitrile hydrolysis step should be at least equal in stoichiometry to the amount of nitrile to be hydrolyzed.

The catalyst component of the present invention may include any dicarboxylic acid which promotes the hydrolysis of nitriles. Representative classes of catalysts may include aliphatic and aromatic dicarboxylic acids. Specific examples of catalysts include adipic acid and terephthalic acid. An effective amount of catalyst to promote the hydrolysis is needed in the present invention. The effective amount of catalyst will depend on the catalyst type. Typically this falls within the range of 1 to 50 mole percent of catalyst based on dinitrile. Preferably, from about 5 to about 20 mole percent of catalyst based on dinitrile is to be employed.

The hydrolysis process involves heating the nitrile, water, and a catalyst in the temperature range of 200 to 300° C. The reactor design is not critical. The reactor may be a stirred autoclave, an unstirred autoclave, a column reactor, a tube reactor, a loop reactor and the like. The process is generally run in the absence of air. The air may be removed by any known process. Examples include purging the reactor with inert gases, such as nitrogen or argon, evacuating the reactor and filling it with inert gases, pressurizing the reactor with inert gases followed by venting to 1 atmosphere, and the like. These processes may be repeated as many times as desired. The temperature range of the process is determined by the rate of the hydrolysis reaction. At temperatures below 200° C., the rate of the hydrolysis reaction is generally too low to be economically useful. At temperatures above 300° C., significant amounts of byproducts may be formed. The reaction temperature may remain constant throughout the course of the reaction or may be varied. The reaction pressure may be within the range of about 25 to 1,000 psig. The reaction pressure may be controlled by, for example, the amount of water added, the reaction temperature, a vent setting or a combination of the same. The length of the hydrolysis process will be a function of the reaction temperature, process design, reaction catalyst type and concentration level and the like. The time should be long enough to effectively hydrolyze at least 95 mole percent of the nitrile. Preferably, the time should be long enough to effectively hydrolyze at least 98 mole percent of the nitrile.

A further aspect of the present invention comprises the use of the as formed nitrile hydrolysate in the production of polyamides. This was performed by adding the diamine to the hydrolysate followed by heating and polymerization. Surprisingly the produced polyamides of the present invention have been found to have low levels of the above mentioned triamine impurities. Further, the as-formed polyamides have been surprisingly found to have enhanced melt stability when compared to the art.

In the present invention, diamine is meant to include any material which incorporates two amine functions. Preferably, the diamine will contain from 2 to 20 carbons. The diamine may be aliphatic, straight chain or branched, or aromatic. The diamine may contain other functionalities. Specific examples of diamines which may find use in the present invention include hexamethylenediamine, tetramethylenediamine, 1,12-dodecane diamine, and p-xylene diamine. The diamine should be added at a level of within 10 mole percent of equimolar based on the nitrile. The exact level will be determined by the molecular weight desired, the reactor design, losses of the nitrile during the hydrolysis process, losses of diamine during the polymerization process and the like.

Other substances may be added with the diamine. Examples of said substances may include water, stabilizers, polymerization catalysts, processing aids and the like.

The polymerization process involves heating the nitrile hydrolysate, diamine, and water in the temperature range of 200 to 350° C. The reactor design is not critical. The reactor may be the same reactor design used for the hydrolysis process or may be different. The reactor may be a stirred autoclave, an unstirred autoclave, a column reactor, a tube reactor, a loop reactor, or the like. The process is generally run in the absence of air. The air may be removed by any known process. Examples include purging the reactor with inert gases, such as nitrogen or argon, evacuating the reactor and filling it with inert gases, pressurizing the reactor with inert gases followed by venting to 1 atmosphere and the like. These processes may be repeated as many times as desired. The temperature range of the process is determined by the rate of the polymerization and the melting point of the product polymer. The temperature will generally be in the range of 200 to 350° C. The pressure in the polymerization process may be in the range of 0 to 1000 psig or may be performed under vacuum. The pressure may be constant throughout the polymerization process or may be varied. Generally the pressure will be reduced during the polymerization process. The polymerization process will require a sufficient time to form polymer. This time will be a function of the specific reactants, the product desired, the reaction temperature, the reaction pressure, and the like. Generally the polymerization process will require from 0.1 to 10 hours. In the background art (for example U.S. Pat. No. 3,847,876) it has been taught that to produce high molecular weight polyamides, the polymerization should be conducted within specific temperature/pressure stages. The specific temperature/pressure profile will generally depend on the specific reactants used and the product desired. In the present invention with the adiponitrile hydrolysate and hexamethylene diamine, it has been generally found that the polymerization process may include heating the reactants to 250 to 310° C. with pressures between 200 and 300 psig (set by the vent) followed by reducing the pressure and finishing in the temperature range of about 250 to 310° C. This should not be considered limiting.

In the following Examples adiponitrile hydrolysis level and products were determined by high pressure liquid chromatography (HPLC) analysis. Relative viscosity (RV) of the polymer samples was determined as a 8.4 weight percent polymer solution in 90.0% formic acid. Polyamide end group analysis was determined by titration. And, bis(hexamethylene)triamine (BHMT) levels were determined by gas chromatography (GC) analysis of the polyamide hydrolysate, all as generally known in the art.

EXAMPLE 1

A mixture of adiponitrile (100.00 grams), water (80.00 grams), and adipic acid (15.00 grams), was added to a 400 cc stainless steel shaker tube at room temperature. The shaker tube was pressurized to 60 psig with nitrogen and then the pressure was released. This operation was repeated for a total of 6 times. With shaking, the shaker tube was heated to 230° C. After achieving 230° C., a peak autogenous pressure of 394 psig was observed. During the course of this operation the pressure slowly reduced to 361 psig observed at the end. After 5 hours at 230° C., the shaker tube was allowed to cool to room temperature. The contents of the shaker tube were analyzed by high pressure liquid chromatography (HPLC) with the results shown below in Table 1.

TABLE 1

| | Product Analysis. | | | | |
|---|---|---|---|---|---|
| Example | Adipamide (wt. %) | Adipamic Acid (wt. %) | 5-Cyano Valeramide (wt. %) | Adipic Acid (wt. %) | 5-Cyano Valeric Acid (wt. %) |
| 1 | 31.6 | 33.0 | 0.61 | 7.16 | 0.69 |
| 2 | 32.3 | 32.7 | ND | 6.80 | ND |
| 3 | 14.9 | 26.6 | 0.05 | 10.1 | 0.2 |
| 4 | 15.2 | 25.0 | 0.3 | 9.8 | 0.5 |
| 5 | 27.8 | 34.9 | 0.4 | 9.2 | ND |
| 6 | 30.1 | 32.6 | 1.2 | 7.5 | ND |
| 7 | 23.8 | 22.4 | 8.4 | 5.3 | 5.1 |
| C1 | 0.02 | 0.01 | 1.6 | ND | ND |
| 8 | 22.2 | 24.5 | 4.1 | 6.3 | 2.8 |

"ND" signifies that the material was not detected.
Reported results represent the average of two determinations.

EXAMPLE 2

A mixture of adiponitrile (100.00 grams), water (80.00 grams), and adipic acid (15.00 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After achieving 230° C., the reaction pressure was found to vary between 380 and 366 psig during the course of the operation. After 8 hours at 230° C., the shaker tube was allowed to cool to room temperature. The contents of the shaker tube were analyzed by HPLC with the results shown above in Table 1.

EXAMPLE 3

A mixture of adiponitrile (100.00 grams), water (166.60 grams), and adipic acid (15.00 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 250° C. After achieving 250° C., the reaction pressure was found to vary between 594 and 630 psig during the course of the operation. After 3 hours at 250° C., the shaker tube was allowed to cool to room temperature. The contents of the shaker tube were analyzed by HPLC with the results shown above in Table 1.

EXAMPLE 4

A mixture of adiponitrile (100.00 grams), water (166.60 grams), and adipic acid (15.00 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 250° C. After achieving 250° C., the reaction pressure was found to vary between 566 to 699 psig during the course of the operation. After 5 hours at 250° C., the shaker tube was allowed to cool to room temperature. The contents of the shaker tube were analyzed by HPLC with the results shown above in Table 1.

EXAMPLE 5

A mixture of adiponitrile (100.00 grams), water (90.00 grams), and adipic acid (20.27 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After achieving 230° C., the reaction pressure was found to vary between 395 to 370 psig during the course of the operation. After 5 hours at 230° C., the shaker tube was allowed to cool to room temperature. The contents of the shaker tube were analyzed by HPLC with the results shown above in Table 1.

EXAMPLE 6

A mixture of adiponitrile (100.00 grams), water (90.00 grams), and adipic acid (13.51 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After achieving 230° C., the reaction pressure was found to vary between 404 to 373 psig during the course of the operation. After 5 hours at 230° C., the shaker tube was allowed to cool to room temperature. The contents of the shaker tube were analyzed by HPLC with the results shown above in Table 1.

EXAMPLE 7

A mixture of adiponitrile (100.00 grams), water (90.00 grams), and adipic acid (6.76 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After achieving 230° C., the reaction pressure was found to vary between 378 to 373 psig during the course of the operation. After 5 hours at 230° C., the shaker tube was allowed to cool to room temperature. The contents of the shaker tube were analyzed by HPLC with the results shown above in Table 1.

COMPARATIVE EXAMPLE C1

A mixture of adiponitrile (100.00 grams), and water (90.00 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After achieving 230° C., the reaction pressure was found to vary between 368 to 366 psig during the course of the operation. After 5 hours at 230° C., the shaker tube was allowed to cool to room temperature. The contents of the shaker tube were analyzed by HPLC with the results shown above in Table 1. It should be noted that the HPLC method does not detect unreacted adiponitrile. It is assumed that the product from the experiment is essentially unreacted adiponitrile.

EXAMPLE 8

A mixture of adiponitrile (100.00 grams), water (90.00 grams), and adipic acid (13.51 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After achieving 230° C., the reaction pressure was found to vary between 397 to 373 psig during the course of the operation. After 4 hours at 230° C., the shaker tube was allowed to cool to room temperature. The contents of the shaker tube were analyzed by HPLC with the results shown above in Table 1.

COMPARATIVE EXAMPLE C2

A mixture of adiponitrile (40.00 grams), water (7.79 grams), adipic acid (6.03 grams), and hexamethylenediamine (68.34 grams of a 69.76 weight percent aqueous hexamethylenediamine solution) was added to a 300 cc stainless steel autoclave. The autoclave was pressurized to 300 psig with nitrogen and then the pressure was released. This operation was repeated for a total of 3 times. The autoclave was pressurized to 300 psig with nitrogen and then the pressure was vented down to 100 psig nitrogen and heated to 240° C. with stirring. After achieving 240° C., the pressure was found to vary from 476 psig to 672 psig. After 2 hours at 240° C., the pressure was vented down to 188 psig over 21 minutes while maintaining a temperature of 240° C. The reaction temperature was then raised to 260° C. over 1 hour while the reaction pressure was maintained between 186 psig and 200 psig. While maintaining a reaction temperature of 260° C., the reaction pressure was vented down to 94 psig over 9 minutes. With stirring, the autoclave was heated to 275° C. over 30 minutes while maintaining a pressure of between 88 to 94 psig. After achieving 275° C., the reaction was allowed to stir for 30 minutes while maintaining a pressure of between 89 to 91 psig. The autoclave was then allowed to cool to room temperature. The resulting product was analyzed for relative viscosity (RV) end groups and bis(hexamethylene)triamine (BHMT) level with the results shown below in Table 2.

The product was then subjected to a melt stability test. This melt stability test was performed as follows. The product was dried at 80° C. overnight in a vacuum oven (p=20 inches Hg) with a slight nitrogen purge. 5 grams of the product was then melted with stirring for 10 minutes at 285° C. under a nitrogen atmosphere. The resulting material was allowed to cool to room temperature, isolated and analyzed for relative viscosity (RV). The results are summarized below in Table 3.

TABLE 2

Polymer Analytical Results.

| Example | RV | End Group Amine (moles/million grams polymer) | Analysis Acid (moles/million grams polymer) | BHMT (ppm) |
|---|---|---|---|---|
| C2 | 8.5 | 266 | 53 | 1,161 |
| 9 | 41 | 41 | 73 | 279 |
| C3 | 49 | 28, 86 | 30 | 47 |
| 10 | 34 | 41 | 86 | 172 |

TABLE 3

Melt Stability Test Results.

| Example | Original RV | Melt-Treated RV |
|---|---|---|
| C2 | 8.5 | 16 |
| 9 | 41 | 59 |
| C3 | 49 | 104 |
| 10 | 34 | 59 |

EXAMPLE 9

A mixture of adiponitrile (40.00 grams), water (33.26 grams), and adipic acid (6.03 grams) was added to a 300 cc stainless steel autoclave. The autoclave was pressurized to 300 psig with nitrogen and then the pressure was released. This operation was repeated for a total of 3 times. The autoclave was pressurized to 300 psig with nitrogen and then the pressure was vented to 10 psig nitrogen and heated to 240° C. with stirring. After 5 hours at 240° C., the autoclave was allowed to cool to room temperature. The autoclave was opened and hexamethylenediamine (68.34 grams of a 69.76 weight percent aqueous hexamethylenediamine solution) was added. The autoclave was resealed. The autoclave was pressurized to 300 psig with nitrogen and then the pressure was released. This operation was repeated for a total of 3 times. The autoclave was pressurized to 300 psig with nitrogen and then the pressure was vented to 10 psig nitrogen. With stirring, the autoclave was heated to 275° C. with the vent set at 250 psig. After achieving 275° C., the pressure was reduced down to atmospheric pressure over one hour. The polymerization was finished at atmospheric pressure at 275° C. for 45 minutes and then the autoclave was allowed to cool to room temperature. The resulting product was analyzed for relative viscosity (RV) end groups and bis(hexamethylene)triamine (BHMT) level with the results shown above in Table 2.

The product was then subjected to a melt stability test as described above for Comparative Example C2, with the results summarized above in Table 3.

COMPARATIVE EXAMPLE C3

A mixture of adiponitrile (40.00 grams), water (33.26 grams), adipic acid (6.00 grams), phosphorous acid (0.41 grams), and calcium hypophosphite (0.15 grams) was added to a 300 cc stainless steel autoclave. The autoclave was pressurized to 300 psig with nitrogen and then the pressure was released. This operation was repeated for a total of 3 times. The autoclave was pressurized to 300 psig with nitrogen and then the pressure was vented to 40 psig nitrogen and heated to 230° C. with stirring. After 6 hours at 230° C., the autoclave was allowed to cool to room temperature. The autoclave was opened and hexamethylenediamine (68.46 grams of a 69.76 weight percent aqueous hexamethylenediamine solution) was added. The autoclave was resealed. The autoclave was pressurized to 300 psig with nitrogen and then the pressure was released. This operation was repeated for a total of 3 times. The autoclave was then pressurized to 300 psig with nitrogen and then the pressure was vented to 10 psig nitrogen. With siring, the autoclave was heated to 270° C. with the vent set at 200 psig. After achieving 270° C., the pressure was reduced down to atmospheric pressure over 20 minutes. The polymerization was finished at atmospheric pressure at 270° C. for 20 minutes and then the autoclave was allowed to cool to room temperature. The resulting product was analyzed for relative viscosity (RV) end groups, and bis(hexamethylene)triamine (BHMT) level with the results shown above in Table 2.

The product was then subjected to a melt stability test as described above for Comparative Example C2, with the results summarized above in Table 3.

EXAMPLE 10

A mixture of adiponitrile (40.00 grams), water (33.26 grams), and adipic acid (6.00 grams) was added to a 300 cc stainless steel autoclave. The autoclave was pressurized to 300 psig with nitrogen and then the pressure was released. This operation was repeated for a total of 3 times. The autoclave was then pressurized to 300 psig with nitrogen, the pressure was vented to 10 psig nitrogen and the autoclave was heated to 230° C. with stirring. After 6 hours at 230° C., the autoclave was allowed to cool to room temperature. The autoclave was opened and hexamethylenediamine (68.46 grams of a 69.76 weight percent aqueous hexamethylenediamine solution) was added. The autoclave was resealed. The autoclave was pressurized to 300 psig with nitrogen and then the pressure was released. This operation was repeated for a total of 3 times. The autoclave was pressurized to 300 psig with nitrogen and then the pressure was vented to 10 psig nitrogen. With stirring, the autoclave was heated to 270° C. with the vent set at 200 psig. After achieving 270° C., the pressure was reduced down to atmospheric pressure over 20 minutes. The polymerization was finished at atmospheric pressure at 270° C. for 20 minutes and then the autoclave was allowed to cool to room temperature. The resulting product was analyzed for relative viscosity, (RV), end groups, and bis(hexamethylene)triamine (BHMT) level with the results shown above in Table 2.

The product was then subjected to a melt stability test as described above for Comparative Example C2, with the results summarized above in Table 3.

In the following Examples adiponitrile hydrolysis level and products were determined by high pressure liquid chromatography (HPLC) analysis. Relative viscosity (RV) of the polymer samples was determined as a 8.4 weight percent polymer solution in 90.0% formic acid. Polyamide end group analysis was determined by titration. And, bis(hexamethylene)triamine (BHMT) levels were determined by gas chromatography (GC) analysis of the polyamide hydrolysate, all as generally known in the art.

Having thus described and exemplified the invention with a certain degree of particularity, it should be appreciated that the following claims are not to be so limited but are to be afforded a scope commensurate with the wording of each element of the claim and equivalents thereof.

We claim:

1. A process for producing polyamide comprising the steps of:
   a) reacting a dinitrile containing 2 to 20 carbon atoms with at least a stoichiometric amount of water in the presence of a dicarboxylic acid as the sole catalyst at a temperature from 200 to 300° C. in a closed vessel under autogenous conditions substantially free of air for a time sufficient for at least 95 mole % of the dinitrile to undergo hydrolysis and form a hydrolysate;
   b) adding a diamine to said hydrolysate formed in step (a) wherein the amount of diamine is within 10 mole % of equimolar based on the starting amount of dinitrile;
   c) heating the hydrolysate and diamine mixture in the presence of water for a time sufficient to polymerize; and then
   d) recovering polyamide having a triamine content less than 1,000 ppm and improved melt stability.

2. A process of claim 1 wherein said dinitrile is selected from the group consisting of adiponitrile, suberonitrile, sebaconitrile, 1,12-dodecane dinitrile, terephthalonitrile, and methyl glutaronitrile and, wherein said diamine is selected from the group consisting of hexamethylenediamine, tetramethylenediamine, 1,12-dodecane diamine, and p-xylene diamine.

3. A process of claim 1 wherein said dinitrile is adiponitrile, said diamine is hexamethylenediamine, and said dicarboxylic acid is adipic acid and wherein said recovered polyamide is (nylon 6,6).

4. A polyamide produced according to a process according to claim 1.

5. A polyamide produced according to a process according to claim 3.

6. The process of claim 1, wherein the polyamide produced is nylon 6,6.

7. The process of claim 1, wherein the catalyst is present in an amount of from about 1 to about 50 mole percent of catalyst based on dinitrile.

8. The process of claim 7, wherein the catalyst is present in an amount of from about 5 to about 20 mole percent of catalyst based on dinitrile.

9. A process for producing polyamide comprising the steps of:
   a) reacting a dinitrile containing 2 to 20 carbon atoms with at least a stoichiometric amount of water in the presence of a dicarboxylic acid as the sole catalyst at a temperature from 200 to 300° C. in a closed vessel under autogenous conditions substantially free of air for a time sufficient for at least 95 mole % of the dinitrile to undergo hydrolysis and form a hydrolysate;
   b) adding a diamine to said hydrolysate formed in step (a) wherein the amount of diamine is within 10 mole % of equimolar based on the starting amount of dinitrile;
   c) heating the hydrolysate and diamine mixture in the presence of water for a time sufficient to polymerize; and then
   d) recovering polyamide having a triamine content of less than 279 ppm and improved melt stability.

10. The process of claim 9, wherein said dinitrile is selected from the group consisting of adiponitrile, suberonitrile, sebaconitrile, 1,12-dodecane dinitrile, terephthalonitrile, and methyl glutaronitrile and wherein said diamine is selected from the group consisting of hexamethylenediamine, tetramethylenediamine, 1,12-dodecane diamine, and p-xylene diamine.

11. The process of claim 9, wherein said dinitrile is adiponitrile, said diamine is hexamethylenediamine, and said dicarboxylic acid is adipic acid and wherein said recovered polyamide is nylon 6,6.

12. The process of claim 9, wherein the polyamide produced is nylon 6,6.

13. The process of claim 9, wherein the catalyst is present in an amount of from about 1 to about 50 mole percent of catalyst based on dinitrile.

14. The process of claim 9, wherein the catalyst is present in an amount of from about 5 to about 20 mole percent of catalyst based on dinitrile.

15. A polyamide produced according to a process according to claim 9.

* * * * *